(12) United States Patent
Haid et al.

(10) Patent No.: US 12,129,435 B2
(45) Date of Patent: Oct. 29, 2024

(54) SYSTEM AND METHOD FOR THE PRODUCTION OF SYNTHETIC FUELS WITHOUT FRESH WATER

(71) Applicant: EDL ANLAGENBAU GESELLSCHAFT MBH, Leipzig (DE)

(72) Inventors: Michael Haid, Ratingen (DE); Rolf Gambert, Grimma (DE)

(73) Assignee: EDL ANLAGENBAU GESELLSCHAFT MBH, Leipzig (DE)

( * ) Notice: Subject to any disclaimer, the term of this patent is extended or adjusted under 35 U.S.C. 154(b) by 316 days.

(21) Appl. No.: 17/771,918

(22) PCT Filed: Dec. 6, 2021

(86) PCT No.: PCT/EP2021/084419
§ 371 (c)(1),
(2) Date: Apr. 26, 2022

(87) PCT Pub. No.: WO2022/122663
PCT Pub. Date: Jun. 16, 2022

(65) Prior Publication Data
US 2023/0220284 A1 Jul. 13, 2023

(30) Foreign Application Priority Data
Dec. 6, 2021 (EP) .................................. 20212138.0

(51) Int. Cl.
*C10G 2/00* (2006.01)
(52) U.S. Cl.
CPC ....... *C10G 2/50* (2013.01); *C10G 2300/1022* (2013.01); *C10G 2400/08* (2013.01)

(58) Field of Classification Search
CPC .............. C10G 2/50; C10G 2300/1022; C10G 2400/08; C10G 2/32; B01D 53/1475;
(Continued)

(56) References Cited

U.S. PATENT DOCUMENTS
10,421,913 B2 9/2019 von Olshausen et al.

FOREIGN PATENT DOCUMENTS
GB 2468483 A 9/2010
WO 2008044056 A2 4/2008

*Primary Examiner* — Jafar F Parsa
(74) *Attorney, Agent, or Firm* — Robert S. Lelkes; Lelkes IP (57) ABSTRACT

The present invention relates to a system for producing synthetic fuels, in particular jet fuel (kerosene), gasoline and/or diesel, comprising:
a) an apparatus for separately extracting carbon dioxide and water from ambient air,
b) a synthesis gas production apparatus for producing a raw synthesis gas comprising carbon monoxide, hydrogen, carbon dioxide and water, the synthesis gas production apparatus having a supply line for carbon dioxide leading from the apparatus for separately extracting carbon dioxide and water from ambient air, a supply line for air and a supply line for water,
c) a separating apparatus for separating carbon dioxide and water from the raw synthesis gas produced in the synthesis gas production apparatus,
d) a Fischer-Tropsch apparatus for producing hydrocarbons by means of a Fischer-Tropsch process from the synthesis gas from which carbon dioxide and water were separated in the separating apparatus,
e) a refining apparatus for refining the hydrocarbons produced in the Fischer-Tropsch apparatus into synthetic fuels,
f) a desalination apparatus for desalinating water, the desalination apparatus having a water supply line from the
(Continued)

apparatus for separately extracting carbon dioxide and water from ambient air and a water discharge line to the Fischer-Tropsch apparatus, and g) a water purification apparatus, which comprises a water supply line leading from the Fischer-Tropsch apparatus for purifying water produced therein, the system further comprising a pre-reformer for converting hydrocarbons other than methane into methane, carbon oxides, water and hydrogen and i) a water vapor supply line leading from the water purification apparatus to the pre-reformer, ii) a process gas supply line leading from the refining apparatus to the pre-reformer and/or a return gas line leading from the Fischer-Tropsch apparatus to the pre-reformer and iii) a circulation line leading from the pre-reformer to the supply line for water connected to the synthesis gas production apparatus.

18 Claims, 1 Drawing Sheet

(58) Field of Classification Search
CPC .............. B01D 53/265; B01D 2256/22; B01D 2257/80; B01D 2258/06; C25B 1/042; C25B 15/081
See application file for complete search history.

SYSTEM AND METHOD FOR THE PRODUCTION OF SYNTHETIC FUELS WITHOUT FRESH WATER

The present invention relates to a system and to a method for producing synthetic fuels, in particular jet fuel, diesel and/or gasoline.

There are a number of different methods for producing fuels, such as jet fuel, diesel, gasoline or the like. Such methods are mainly based on the processing of fossil raw materials, such as the refining of crude oil, the liquefaction of coal or the synthesis of fuels from natural gas, water and oxygen. The synthesis of fuels from natural gas, water and oxygen is also known as the "gas-to-liquids" method. In this method, synthesis gas comprising hydrogen and carbon monoxide is first produced from natural gas, water and oxygen, which is then converted to hydrocarbons in a Fischer-Tropsch synthesis, which hydrocarbons consist primarily of long-chain normal paraffins. These hydrocarbons are then converted into synthetic fuels by means of cracking and isomerization.

A similar method is the conversion of electrical energy into synthetic fuels, which is known as "power-to-liquids." For this purpose, water and carbon dioxide are converted into synthesis gas, which is then processed into synthetic fuels in a similar way to the "gas-to-liquids" method. A significant disadvantage of the "gas-to-liquids" method and the "power-to-liquids" method is that considerable amounts of fresh water are required. However, water of the required purity is an expensive raw material. In addition, in the known methods, comparatively large quantities of waste gases and waste water that are unused in the methods are produced that are undesirable from an environmental point of view.

Proceeding from this, the object of the present invention was to provide a system and a method for producing synthetic fuels, which can be operated without or with at most a small amount of fresh water supply and with the production of only very small amounts of unused exhaust gases and waste water, which results in an increased yield of synthetic fuels, and which can still be operated exclusively with electrical energy and preferably renewable energy.

According to the invention, this object is achieved by a system for producing synthetic fuels, in particular jet fuel, diesel and/or gasoline, which comprises:
a) an apparatus for separately extracting carbon dioxide and water from ambient air,
b) a synthesis gas production apparatus for producing a raw synthesis gas comprising carbon monoxide, hydrogen, carbon dioxide and water, the synthesis gas production apparatus having a supply line for carbon dioxide leading from the apparatus for separately extracting carbon dioxide and water from ambient air, a supply line for air and a supply line for water or water vapor,
c) a separating apparatus for separating carbon dioxide and water from the raw synthesis gas produced in the synthesis gas production apparatus,
d) a Fischer-Tropsch apparatus for producing hydrocarbons by means of a Fischer-Tropsch process from the synthesis gas from which carbon dioxide and water were separated in the separating apparatus,
e) a refining apparatus for refining the hydrocarbons produced in the Fischer-Tropsch apparatus into synthetic fuels,
f) a desalination apparatus for desalinating water, the desalination apparatus having a water supply line from the apparatus for separately extracting carbon dioxide and water from ambient air and a water discharge line to the Fischer-Tropsch apparatus, and
g) a water purification apparatus comprising a water supply line leading from the Fischer-Tropsch apparatus for purifying water produced therein,
the system further comprising a pre-reformer for converting hydrocarbons other than methane into methane, carbon oxides, water and hydrogen and i) a water vapor supply line leading from the water purification apparatus to the pre-reformer, ii) a process gas supply line leading from the refining apparatus to the pre-reformer and/or a return gas line leading from the Fischer-Tropsch apparatus to the pre-reformer and iii) a circulation line leading from the pre-reformer to the supply line for water or water vapor connected to the synthesis gas production apparatus.

In that in the system according to the invention and the method according to the invention the water required for fuel synthesis, in particular for synthesis gas production and for Fischer-Tropsch synthesis, is partly obtained from ambient air and the carbon dioxide required for this is completely obtained from ambient air and the (reaction) water produced during fuel synthesis, such as in particular Fischer-Tropsch synthesis, in the water purification apparatus and preferably also the (reaction) water produced in synthesis gas production in the desalination apparatus are purified to the extent required for circulation, processed in the pre-reformer and returned from there to the synthesis gas production apparatus, the system according to the invention and the method according to the invention can be operated solely with the water produced from ambient air and (reaction) water produced from the operation of the system in Fischer-Tropsch synthesis and optionally other system parts, such as the synthesis gas production apparatus, i.e., without or with at most a small amount of fresh water supply and in particular in a carbon dioxide-neutral manner. The use of the (reaction) water produced in the Fischer-Tropsch synthesis carried out in the Fischer-Tropsch apparatus, in particular in the synthesis gas production apparatus, is important in order to be able to work without or with at most a small amount of fresh water supply because the water obtained from the air in the apparatus for separately extracting carbon dioxide and water from ambient air alone is not regularly sufficient for this purpose. The use of the (reaction) water produced during the Fischer-Tropsch synthesis in the synthesis gas production apparatus is only made possible by the fact that said (reaction) water, which is characterized by an extremely high COD content, due to contamination with about 2% by mass of hydrocarbons, such as in particular $C_{1-6}$ alcohols, aldehydes and acetone, is purified in the water purification apparatus in order to separate at least the impurities causing the high COD content and then treated in the pre-reformer before being returned to the synthesis gas production apparatus via the supply line for water. As explained below, the purification of the water in the water purification apparatus is preferably carried out in such a way that at least a large part of the approximately 2% by mass of hydrocarbon impurities remains in the purified water from which the impurities causing the high COD content have been separated. These hydrocarbons are then converted to methane, carbon oxides, water and hydrogen in the pre-reformer, which can be recycled in the synthesis gas production apparatus. Thus, in addition to the (reaction) water produced in the Fischer-Tropsch synthesis, hydrocarbon waste from the Fischer-Tropsch synthesis can also be recycled in the synthesis gas production apparatus. A further advantage of the system according to the invention is that, by means of the process gas supply line leading from the refining apparatus to the pre-reformer or the return gas line leading from the Fischer-Tropsch apparatus to the pre-reformer, process gases from the refining apparatus, which contain in particular $C_{1-5}$ hydrocarbons, or process gases from the Fischer-Tropsch apparatus, which contain in particular $C_{1-7}$ hydrocarbons, carbon monoxide and carbon dioxide, are converted to methane, carbon oxides, water and hydrogen in the pre-reformer, which are recycled in the synthesis gas production apparatus into which they are supplied via the circulation line. Thus, hydrocarbon by-products are recycled in the system according to the invention or the method according to the invention instead of being discharged and disposed of as a waste product, which not only reduces the amount of waste products produced, but in particular also maximizes the yield and thus increases the efficiency of the synthesis gas production system by at least 13%. Therefore, the apparatus for separately extracting carbon dioxide and water from ambient air, the desalination apparatus, the water purification apparatus, the pre-reformer and the synthesis gas production apparatus work together synergistically in order not only to use (reaction) water produced in the Fischer-Tropsch synthesis, but in order to also recycle hydrocarbons produced in the Fischer-Tropsch synthesis and optionally in the refining apparatus, thus maximizing the yield of synthetic fuels, minimizing the amount of hydrocarbon waste and reducing the fresh water requirements of the system to zero or at least to very low values. Apart from this, the amount of waste water discharged from the system during its operation can thereby be reduced considerably. In addition, the system according to the invention and the method according to the invention make it possible to significantly reduce the amount of unused exhaust gases because the process gases that are produced are recycled in the individual parts of the system. Finally, the system according to the invention and the method according to the invention can be operated exclusively with electrical energy and in a resource-saving manner because natural and fossil raw materials such as crude oil, natural gas and the like are not required.

According to the present invention, an apparatus for separately extracting carbon dioxide and water from ambient air is an apparatus that can extract carbon dioxide and water from ambient air and then make them available separately from one another. An apparatus for separately extracting carbon dioxide and water from ambient air can thus simultaneously collect the carbon dioxide and water from the air, but after which the water is separated from the carbon dioxide such that the apparatus for separately extracting carbon dioxide and water provides a flow of water and a separate flow of carbon dioxide.

According to the invention, the separating apparatus is designed to separate carbon dioxide and water from the raw synthesis gas produced in the synthesis gas production apparatus, the Fischer-Tropsch apparatus is designed to produce hydrocarbons from the synthesis gas, from which carbon dioxide and water were separated in the separating apparatus, by means of a Fischer-Tropsch process, and the refining apparatus is designed to refine the hydrocarbons produced in the Fischer-Tropsch apparatus into the synthetic fuels. This means that the separating apparatus for separating carbon dioxide and water is connected to the synthesis gas production apparatus via a supply line for raw synthesis gas, the Fischer-Tropsch apparatus for producing hydrocarbons by means of a Fischer-Tropsch process is connected to the separating apparatus via a supply line for synthesis gas, and the refining apparatus is connected to the Fischer-Tropsch apparatus via a supply line for hydrocarbons.

As explained above, the system according to the invention can be operated without or with at most a small amount of fresh water and therefore preferably has no fresh water supply line. Fresh water supply line refers to any line that guides water into the system from the outside, with the exception of line(s) that guide ambient air containing a small percentage of water into the system.

According to the invention, the system comprises a pre-reformer for converting hydrocarbons higher than methane into methane, carbon oxides, water and hydrogen and a water vapor supply line leading from the water purification apparatus to the pre-reformer, via which water vapor is supplied from the water purification apparatus, which water vapor contains higher hydrocarbons from the Fischer-Tropsch synthesis, which is carried out in the Fischer-Tropsch apparatus. Higher hydrocarbons are all hydrocarbon compounds having more than one carbon atom per molecule and in particular $C_{2-7}$ hydrocarbons. The pre-reformer allows the hydrocarbons that have accumulated in the Fischer-Tropsch apparatus and in the refining apparatus to be broken down into methane, carbon oxides, water and hydrogen and thus recycled in the system according to the invention, for example by supplying them to the synthesis gas production apparatus. Because of the conversion of all hydrocarbon-containing waste gas flows produced in the pre-reformer, practically no emissions of hydrocarbons occur in the system according to the invention, and the efficiency of the system is significantly increased by recycling the gaseous hydrocarbon flows. Consequently, said pre-reformer increases the carbon yield in the method carried out in the system according to the invention and thus also the overall yield of the method. In addition, the pre-reformer protects the downstream synthesis gas production apparatus from harmful sulfur compounds by lowering the pollutant load below the 1 ppb range, which is in particular advantageous if the synthesis gas production apparatus comprises one or more co-solid oxide electrolytic cells. Finally, the pre-reformer protects the downstream synthesis gas production apparatus from coking by removing the higher hydrocarbons from the flow in the pre-reformer.

In detail, three partial reactions take place in the pre-reformer, which can also be referred to as an autothermal reformer or adiabatic reformer, namely an endothermic reaction followed by exothermic methanation and an exothermic shift reaction in a thermodynamic equilibrium between the carbon oxides ($CO$, $CO_2$), methane, hydrogen and water according to the following partial reactions:

$$C_nH_m + nH_2O \rightarrow nCO + \left(n + \frac{m}{2}\right)H_2 \quad \Delta H > 0 \quad (1)$$

$$CO + 3H_2 \rightarrow CH_4 + H_2O \quad \Delta H = -206\frac{kJ}{mole} \quad (2)$$

$$CO + H_2O \rightarrow CO_2 + H_2 \quad \Delta H = -41\frac{kJ}{mole} \quad (3)$$

The pre-reformer preferably contains nickel oxide as a catalyst. Good results are achieved in particular when the catalyst contains nickel oxide applied to a support, aluminum oxide, preferably $Al_2O_3$, for example, being used as the support. The catalyst particularly preferably also contains chromium oxide ($Cr_2O_3$). A catalyst that contains 20 to 30% by mass of nickel on an aluminum oxide support is very particularly preferred, and the catalyst can optionally also contain chromium oxide. The thermal stability of such catalysts is guaranteed up to at least 650° C. In addition, these catalysts have a very high resistance to coking.

The pre-reformer is preferably designed as a fixed-bed reactor, specifically preferably in such a way that the flow through it is from top to bottom during its operation.

Furthermore, it is preferred that the pre-reformer is designed in such a way that it can be operated at a pressure of 5 to 30 bar and/or at a temperature of between 380 and 650° C.

According to the invention, the system therefore comprises a process gas supply line leading from the refining apparatus to the pre-reformer and/or a return gas line leading from the Fischer-Tropsch apparatus to the pre-reformer. In addition, the system comprises a circulation line leading from the pre-reformer to the supply line for water connected to the synthesis gas production apparatus in order to at least largely recycle the process gases that are produced in the refining apparatus and the Fischer-Tropsch apparatus and are processed in the pre-reformer. Furthermore, a water vapor return line preferably also leads from the Fischer-Tropsch apparatus to the synthesis gas production apparatus.

Notwithstanding, it is preferred to discharge part of the process gas that is produced during operation of the Fischer-Tropsch apparatus, which gas is referred to below as torch gas to distinguish it from the other process gases, from the system as torch gas in order to avoid enrichment of the process gases with inert gases. For this reason it is preferred that the Fischer-Tropsch apparatus also has a torch gas discharge line.

According to a further preferred embodiment of the present invention, the apparatus for separately extracting carbon dioxide and water from ambient air is a direct air capture apparatus that has a plurality of adsorption/desorption modules connected in parallel in such a way that an adsorption/desorption module is switched from the adsorption mode to the desorption mode after reaching its equilibrium load. During operation of the direct air capture apparatus, carbon dioxide and water are separated from ambient air in a discontinuous process by means of adsorption on an adsorbent, preferably amine-functionalized porous solids. The carbon dioxide and water or water vapor adsorbed in this way are then separated from the adsorbent by desorption as soon as the adsorbent is loaded with the carbon dioxide and water. In order to make the process at least quasi-continuous, a plurality of adsorption/desorption modules are preferably connected in parallel, as explained above. While the adsorption is carried out at a low temperature, preferably at ambient temperatures (−20 to 40° C.) and normal pressure, the desorption is carried out under a vacuum of, for example, 0.1 to 0.3 bar abs and at an elevated temperature of preferably 120 to 150° C. Once the adsorbent is loaded with the carbon dioxide and water, the air supply and exhaust to the apparatus is shut off to initiate desorption and the desorption phase is initiated by pumping a heating medium through the adsorbent to heat the adsorbent. At the same time, a water ring pump is switched on to extract the mixture of carbon dioxide and water vapor, which water ring pump, in addition to the high desorption temperatures of 150 to 200° C., creates a vacuum to allow optimal desorption. The gas flow from the adsorption/desorption module is cooled with cooling water upstream of the water ring pump, and the liquid ring of the water ring pump is also water-cooled. The water ring pump generates such a low pressure that the mixture of high-purity carbon dioxide and water can be separated in a downstream separator. Although the impurities in the air can in principle be regarded as relatively low, numerous impurities, such as in particular numerous anions and cations (such as ammonia, calcium, magnesium, iron, copper, manganese and chlorides, sulfates, nitrides, nitrates, sulfates, etc.), accumulate in the water separated from the ambient air due to the discontinuous method of adsorption, which impurities have to be separated before the downstream synthesis gas production. For the production of synthesis gas with the co-solid oxide electrolytic cell preferred according to the invention, an electrical conductivity of a maximum of 2 S/cm and preferably less than 2 S/cm is required. Therefore, the carbon dioxide and water extracted from the ambient air in the apparatus for separately extracting carbon dioxide and water are not supplied together to the synthesis gas production apparatus, but the water is first separated from the carbon dioxide by condensation, the separated water being supplied to the desalination apparatus and the carbon dioxide freed from water being supplied to the synthesis gas production apparatus. Once the desorption is complete, the adsorption/desorption module is first cooled down to around 25° C. before the adsorption of carbon dioxide and water from the air starts again. For this purpose, the air inlets and outlets to the apparatus are opened again.

The water having the required purity required for the synthesis gas production is supplied to the synthesis gas production apparatus via the above-mentioned supply line for water, preferably in the form of water vapor, the water vapor preferably additionally containing methane, carbon oxides and hydrogen, which originate from the pre-reformer, and can additionally also be fed with water vapor originating from the Fischer-Tropsch apparatus. Water vapor refers to evaporated water, i.e., water in a gaseous state. Even if the water for synthesis gas production is preferably supplied in the form of water vapor, in this context water is sometimes generally referred to above and below without specifying the state of aggregation. Nevertheless, it also applies to all of the above and subsequent embodiments that the water is preferably supplied to the synthesis gas production apparatus in the form of water vapor.

Good results are achieved in synthesis gas production in particular when the synthesis gas production apparatus comprises one or more co-solid oxide electrolytic cells. The water vapor and carbon dioxide that are supplied separately to the synthesis gas production apparatus are converted to a gas mixture containing carbon monoxide, hydrogen, water vapor and carbon dioxide in the co-solid oxide electrolytic cell, which is preferably operated at 800 to 1,000° C., without pressure and with a DC voltage of preferably 1.29 V, no more than 1.6 V per level and 0.6 A/cm$^2$. The raw synthesis gas produced in this way contains, for example, 50 to 60% by mass of carbon monoxide, 5 to 10% by mass of hydrogen, 10 to 12% by mass of water vapor and 20 to 30% by mass of carbon dioxide. On the secondary side of the ceramic membranes, hot air is blown in to dissipate the oxygen flow that forms. The exhaust air then consists of air and a substantial proportion of oxygen. In the co-solid oxide electrolytic cell, the water vapor electrolysis (reaction (1): $2*H_2O=2*H_2+O_2$) is connected to the reverse water gas shift reaction (RWGS=reverse water gas shift) (reaction (2): $CO_2+H_2=H_2O+CO$). In this case, 1 mole of the $H_2$ from reaction (1) is consumed in reaction (2) and 1 mole of the water formed in reaction (2) is consumed in reaction (1) such that the summary reaction equation $CO_2+2*H_2O=2*H_2+CO+1.5*O_2$ is obtained, which, in a purely stoichiometric case, produces an $H_2/CO$ ratio of 2. The oxygen is transported back through the membrane into the air chamber of the co-solid oxide electrolytic cell. The $H_2/CO$ ratio can be set from 1.5 to 5 via the starting materials, with the $H_2/CO$ ratio preferably being set to slightly more than 2.0 with regard to the subsequent Fischer-Tropsch synthesis. Overall, a gas mixture containing carbon monoxide, hydrogen, water vapor and carbon dioxide is produced in the synthesis gas production apparatus. The water condensed out after the gas mixture has cooled has a comparatively high concentration of ions, which is why it is preferably conducted through the water supply line from the synthesis gas production apparatus to the desalination apparatus. The raw synthesis gas can be produced within a range of a molar ratio of $H_2/CO$ from 1.5 to 5, the objective being an $H_2/CO$ ratio of greater than 2.0 for the Fischer-Tropsch synthesis. Because co-solid oxide electrolytic cells are very sensitive to $C_{2+}$ hydrocarbons because the co-solid oxide electrolytic cells coke when they are operated in the presence of the $C_{2+}$ hydrocarbons, the process and return gases returned to the synthesis gas production apparatus and process water containing hydrocarbons from the Fischer-Tropsch apparatus and the refining apparatus are treated in a pre-reformer according to the invention, in which pre-reformer hydrocarbons other than methane are converted to methane, carbon oxides, water and hydrogen. Methane is then converted to carbon oxides and water vapor with the oxygen in the synthesis gas production apparatus, which are then in turn processed to produce synthesis gas. The methane introduced into the synthesis gas production apparatus via the pre-reformer thus makes a significant contribution to reducing the process endothermy for maintaining the reaction temperature of around 1,000° C.

The raw synthesis gas produced in the one or more co-solid oxide electrolytic cells still contains significant proportions of carbon dioxide and small amounts of water vapor, which are separated off in the downstream separating apparatus in order to optimize the Fischer-Tropsch synthesis. Preferably, the separating apparatus comprises an amine scrubber for separating carbon dioxide by absorption from the raw synthesis gas, a compressor for condensing water and for compressing the synthesis gas to the pressure required in the Fischer-Tropsch synthesis, a carbon dioxide return line leading to the synthesis gas production apparatus or to the line for carbon dioxide leading from the apparatus for separately extracting carbon dioxide and water to the synthesis gas production apparatus and a synthesis gas supply line leading to the Fischer-Tropsch apparatus. In the amine scrubber, carbon dioxide is separated from the raw synthesis gas by absorption with at least one absorbent, which preferably consists of an amine compound such as monoethanolamine and/or diglycolamine and water, and returned to the synthesis gas production apparatus via the carbon dioxide return line. In the downstream compressor, the remaining synthesis gas is compressed to the pressure required for the Fischer-Tropsch synthesis, water being condensed and separated from the synthesis gas at the same time. While the separated water is fed via the water supply line from the separating apparatus to the desalination apparatus, the remaining (purified) synthesis gas is supplied to the Fischer-Tropsch apparatus. The synthesis gas supplied to the Fischer-Tropsch apparatus preferably contains 80 to 90% by mass of carbon monoxide and 10 to 15% by mass of hydrogen. The separation of carbon dioxide from the raw synthesis gas is advantageous because otherwise carbon dioxide would be circulated and enriched because carbon dioxide is produced and not converted in the Fischer-Tropsch synthesis itself. Consequently, the concentration of carbon dioxide is not increased by separating carbon dioxide from the raw synthesis gas and the subsequent parts of the system are protected from excessive carbon dioxide pollution.

In the desalination apparatus, the waste water stream from at least the apparatus for separately extracting carbon dioxide and water and preferably also the waste water stream from the synthesis gas production apparatus and/or the waste water stream from the separating apparatus and/or the waste water stream from the compressor for condensing water and compressing the synthesis gas and particularly preferably the waste water stream from the synthesis gas production apparatus and the waste water stream from the separating apparatus as well as the waste water stream from the compressor for condensing water and for compressing the synthesis gas are processed in such a way that they can be used directly in other parts of the system, such as in particular in the synthesis gas production apparatus, in the Fischer-Tropsch synthesis and, if available, in hydrogen production. For example, the waste water stream from the apparatus for separately extracting carbon dioxide and water contains significant amounts of ammonium ions as well as significant amounts of calcium, magnesium, chloride and sulfate ions. It also contains other ions such as nitrate, nitride, sulfide, iron and manganese. In addition, the waste water streams from the synthesis gas production apparatus, from the separating apparatus, and from the compressor for condensing water and compressing the synthesis gas contain silicon, sodium, calcium, boron, magnesium, iron, lithium, nickel, and lead ions. For this purpose, it is proposed in a further development of the inventive concept that the desalination apparatus is designed such that water can be desalinated and degassed to such an extent that the conductivity thereof is less than 20 µS/cm, preferably less than 10 µS/cm, particularly preferably less than 5 µS/cm and most preferably at most 2 µS/cm. In the present invention, desalinated water having a maximum conductivity of 2 µS/cm is also referred to as fully desalinated water and the desalination apparatus designed for this purpose is referred to as a complete desalination apparatus. For this purpose, the desalination apparatus and preferably complete desalination apparatus preferably has one or more anion and cation exchangers and a membrane apparatus for degassing. During degassing, carbon dioxide, carbon monoxide, nitrogen and oxygen are reliably separated from the water. The anion and cation exchangers are preferably discharged with the aid of caustic soda or hydrochloric acid. The resulting waste water has about 6 times the ion concentration than the water before it is supplied to the desalination apparatus and can be fed to a municipal waste water plant as neutral waste water due to the simultaneous discharge of the anion and cation exchanger.

The synthesis gas is then converted into hydrocarbons in the Fischer-Tropsch apparatus. The Fischer-Tropsch synthesis is preferably carried out in a reactor with a catalyst at a temperature of from 170 to 270° C., preferably from 190 to 250° C. and most preferably from 210 to 230° C., such as 220° C. Suitable catalysts are, in particular, those selected from the group consisting of cobalt catalysts, such as preferably Co/MMT (montmorillonite) or $Co/SiO_2$. The Fischer-Tropsch synthesis is preferably carried out in one or more tube bundle apparatuses, the catalyst being located in the tubes, whereas the cooling medium, preferably boiler feed water, is conducted in the casing space. The Fischer-Tropsch apparatus preferably comprises one or two reactors in order to be able to carry out the Fischer-Tropsch synthesis in one or two stages. For cost reasons, the Fischer-Tropsch synthesis is preferably carried out in one stage. For example, the Fischer-Tropsch synthesis is carried out at a pressure of 25 to 35 bar or preferably also at a higher pressure of, for example, 45 bar. The higher the pressure, the smaller the reactors can be built. The Fischer-Tropsch synthesis is preferably carried out in such a way that a carbon monoxide conversion of 92% or more is achieved. In the Fischer-Tropsch synthesis, condensates and waxes are obtained as liquid products, which condensates and waxes are supplied to the downstream refining apparatus. The very strongly exothermic process of the Fischer-Tropsch synthesis is cooled by boiler feed water, which is conducted via a corresponding line from the desalination apparatus to the Fischer-Tropsch apparatus and evaporated to cool the reactors. At least a large part of the water vapor produced in the Fischer-Tropsch synthesis is preferably supplied to the synthesis gas production apparatus via the preferred water vapor return line described above. The excess amount of water vapor from the Fischer-Tropsch apparatus is preferably used for heating in the other system units such that no external water vapor is required.

In the refining apparatus, the products of the Fischer-Tropsch synthesis are refined into synthetic fuels, in particular jet fuel (kerosene), diesel and/or gasoline. For the production of industrially useful kerosene, diesel and gasoline, it is necessary to convert the paraffinic product of the Fischer-Tropsch synthesis by hydro-isomerization and cracking (isocracking) in such a way that a high-quality jet fuel having the required cold properties (preferably having a temperature limit of filterability corresponding to the "cold filter plugging point" of no more than −40° C.) is produced. The heavy products are recirculated in the isocracker reactor in such a way that only kerosene and gasoline are produced as products. The resulting light gases are conducted as process gases via the process gas supply line described as preferred above from the refining apparatus to the pre-reformer.

For this purpose, the refining apparatus preferably comprises one or more isocracker reactors. Preferably, the one or more isocracker reactors contain a catalyst that does not require sulfidation, thus avoiding contamination of the reaction products with sulfur-containing components, which in turn allows the process gas produced during isocracking, as well as the water vapor produced, to be returned to the synthesis gas production apparatus, which preferably comprises one or more co-solid oxide electrolytic cells. Co-solid oxide electrolytic cells tolerate only very low sulfur concentrations within the range of 1 pbp or less without suffering damage. Good results are obtained in particular when the catalyst of the one or more isocracker reactors is an element selected from the group consisting of ruthenium, rhodium, palladium, silver, rhenium, osmium, iridium, platinum, gold, copper, rhenium, mercury and any combination of two or more of the above elements. The one or more isocracker reactors particularly preferably contain a platinum/palladium catalyst as catalyst. Isocracking is a catalytic reaction in which, in particular, long-chain paraffinic hydrocarbons are produced to form shorter-chain isomers having improved cold properties for the production of kerosene. The catalytic reaction preferably takes place in bed reactors that are cooled with hydrogen to ensure the maximum bed temperature. For example, said bed reactors are operated at a pressure of at least 70 bar.

Furthermore, it is preferred that the refining apparatus comprises one or more hydrogen strippers for separating light hydrocarbons (namely $C_1$ to $C_4$ hydrocarbons). The advantage of using hydrogen as a stripping medium compared to the water vapor conventionally used for this purpose is that the hydrogen, due to its lower molecular mass, results in a significantly better stripping effect compared to water vapor and can be returned to the overall process via the hydrocarbon return gas stream to the synthesis gas production apparatus. This means that the preferred maximum sulfur content in the waste water from the isocracker to the water purification system is reliably maintained.

Finally, the refining apparatus preferably comprises one or more distillation columns for separating the synthetic fuels into individual fractions, such as jet fuel and diesel, jet fuel and gasoline, jet fuel, gasoline and diesel, or the like.

Hydrogen is required for the isocracker reactor and for the hydrogen stripper. For this purpose it is proposed in a further development of the inventive concept that the system further has a hydrogen production apparatus and preferably also a hydrogen compression apparatus. Preferably, the hydrogen production is carried out by means of alkaline low-temperature, high-pressure water electrolysis. Furthermore, it is preferred that the system has a hydrogen compression apparatus to bring the hydrogen produced in the hydrogen production apparatus to the pressure of 60 to 80 bar, such as 70 bar, required for refining in the isocracker reactor and in the hydrogen stripper. Preferably, the system further comprises a water supply line leading from the desalination apparatus to the hydrogen production apparatus, an air supply line leading to the hydrogen production apparatus, a hydrogen line leading from the hydrogen production apparatus to the hydrogen compression apparatus, a water line leading from the hydrogen compression apparatus to the desalination apparatus and a hydrogen line leading from the hydrogen compression apparatus to the refining apparatus.

The waste water generated during the Fischer-Tropsch synthesis having a high proportion of hydrocarbons, such as in particular alcohols, aldehydes, carboxylic acids, etc., having a chemical oxygen demand (COD) of approx. 40,000 mg/l cannot be supplied directly to a municipal biological waste water treatment plant. In addition, said waste water contains about 2% by mass of hydrocarbons, which according to the invention should preferably be used for fuel synthesis. Typically, the waste water generated from the Fischer-Tropsch synthesis contains significant amounts of methanol and ethanol and, in addition, minor amounts of propanols, butanols, 2-pentanol, n-hexane, acetaldehyde, propionaldehyde and acetone. For this reason, the Fischer-Tropsch waste water is fed to the water purification apparatus via a corresponding line. Further, the Fischer-Tropsch water formed during refinement is preferably fed to the water purification apparatus via a corresponding line. The water purification apparatus preferably has one or more partial evaporation units in which preferably at least 70% of the waste water is separated by partial evaporation and thus at least 75% and preferably at least 95% of all hydrocarbons contained therein. Alternatively or in addition to one or more partial evaporation units, all other types of water purification apparatuses can preferably be used, which water purification apparatuses separate water vapor and at least 75% and preferably at least 95% of all hydrocarbons contained therein from the waste water. According to the invention, at least part and preferably all of the separated water vapor and preferably also the separated hydrocarbons are conducted into the pre-reformer via the water supply line or water vapor supply line.

One or more partial evaporation units are particularly preferably used as the water purification apparatus, one or more co-solid oxide electrolytic cells are used as the synthesis gas production apparatus and the refining apparatus contains one or more isocracker reactors having a catalyst that does not require sulfidation. This reliably ensures that only compounds that do not adversely affect the co-solid oxide electrolytic cells, such as by destroying and/or coking them, even over a longer period of operation, are supplied to the synthesis gas production apparatus via the pre-reformer.

A further subject matter of the present invention is a method for producing synthetic fuels, in particular jet fuel, gasoline and/or diesel, which is carried out in a system as described above.

As explained above, the method according to the invention can be operated without fresh water or with at most a small amount of fresh water. For this reason it is preferred that less than 20%, preferably less than 10%, particularly preferably less than 5% and most preferably no fresh water is supplied to the method according to the invention. Fresh water supply means the supply of any water from the outside into the system that has not been obtained in the apparatus for separately extracting carbon dioxide and water from ambient air.

According to a further preferred embodiment of the present invention, provision is made for carbon dioxide to be separated from the synthesis gas in the separating apparatus by absorption with at least one amine compound and preferably with monoethanolamine and/or diglycolamine and water.

Furthermore, it is preferred that the water in the desalination apparatus is purified to water having a conductivity of less than 20 µS/cm, preferably less than 10 µS/cm, particularly preferably less than 5 µS/cm and most preferably at most 2 µS/cm.

In a further development of the inventive concept it is proposed that torch gas is derived from the Fischer-Tropsch apparatus, the flow of torch gas being greater than the quotient of the amount of nitrogen and argon contained in the flow discharged from the apparatus for separately extracting carbon dioxide and water from ambient air and the total concentration of nitrogen and argon set in the return gas flow from the Fischer-Tropsch apparatus to the pre-reformer, the total concentration of nitrogen and argon in the return gas flow from the Fischer-Tropsch apparatus to the pre-reformer preferably being set to 1.5 to 10% by mass. This reliably prevents the accumulation of inert gases such as nitrogen and argon in the synthesis gas production apparatus and in the Fischer-Tropsch apparatus.

According to the invention, process gas produced in the refining apparatus, which process gas preferably contains hydrogen and $C_{15}$ hydrocarbons, and/or return gas produced in the Fischer-Tropsch apparatus, which preferably contains hydrogen, carbon monoxide, carbon dioxide, water, nitrogen and $C_{17}$ hydrocarbons, is supplied to the pre-reformer, in which they are converted to methane, carbon oxides, water and hydrogen before the gas produced in this manner is fed into the synthesis gas production apparatus. Process gas produced in the refining apparatus and return gas produced in the Fischer-Tropsch apparatus are preferably supplied to the pre-reformer.

Good results are also achieved in particular when the system has a hydrogen production apparatus and a hydrogen compression apparatus and the refining apparatus comprises one or more isocracker reactors, a hydrogen stripper and one or more distillation columns, the hydrogen produced in the hydrogen production apparatus being supplied to the hydrogen compression apparatus and being compressed therein and the compressed hydrogen being supplied to the isocracker reactor and the hydrogen stripper of the refining apparatus. The water required to produce the hydrogen is preferably supplied to the hydrogen production apparatus from the desalination apparatus.

According to a further preferred embodiment of the present invention it is provided that the refining apparatus comprises an isocracker reactor containing a catalyst that does not require sulfidation. Preferably, the catalyst contains an element selected from the group consisting of ruthenium, rhodium, palladium, silver, rhenium, osmium, iridium, platinum, gold, copper, rhenium, mercury and any combination of two or more of the above elements. The catalyst particularly preferably contains platinum/palladium. Particularly preferably, the unit contains no catalyst at all that requires sulfidation.

In a further development of the inventive concept, it is proposed that the water purification apparatus is supplied with water from the Fischer-Tropsch apparatus and water from the refining apparatus, the water in the water purification apparatus being purified by partial evaporation in such a way that at least 70% of the waste water is separated by the partial evaporation and thus at least 75% and preferably at least 95% of all hydrocarbons are separated. The water vapor separated in this way and the hydrocarbons separated in this way are supplied to the pre-reformer and the non-partially evaporated water having a COD of less than 2,000 mg/l is supplied to a municipal waste water plant.

Preferably, at least 80%, more preferably at least 90%, particularly preferably at least 95% and most preferably 100% of the water produced in the apparatus for separately extracting carbon dioxide and water from ambient air, in the synthesis gas production apparatus, in the separating apparatus and in the optional hydrogen compression apparatus, is supplied to the desalination apparatus.

Furthermore, it is preferred that, in the separating apparatus, carbon dioxide is completely separated from the synthesis gas such that less than 5% by weight of carbon dioxide is contained in the return gas produced from the synthesis gas in the Fischer-Tropsch apparatus.

Finally, it is preferred that jet fuel, gasoline and/or diesel, and preferably both jet fuel and gasoline, are produced in the refining apparatus.

In the following, the present invention will be described in more detail with reference to the drawings, in which.

Figure 1:
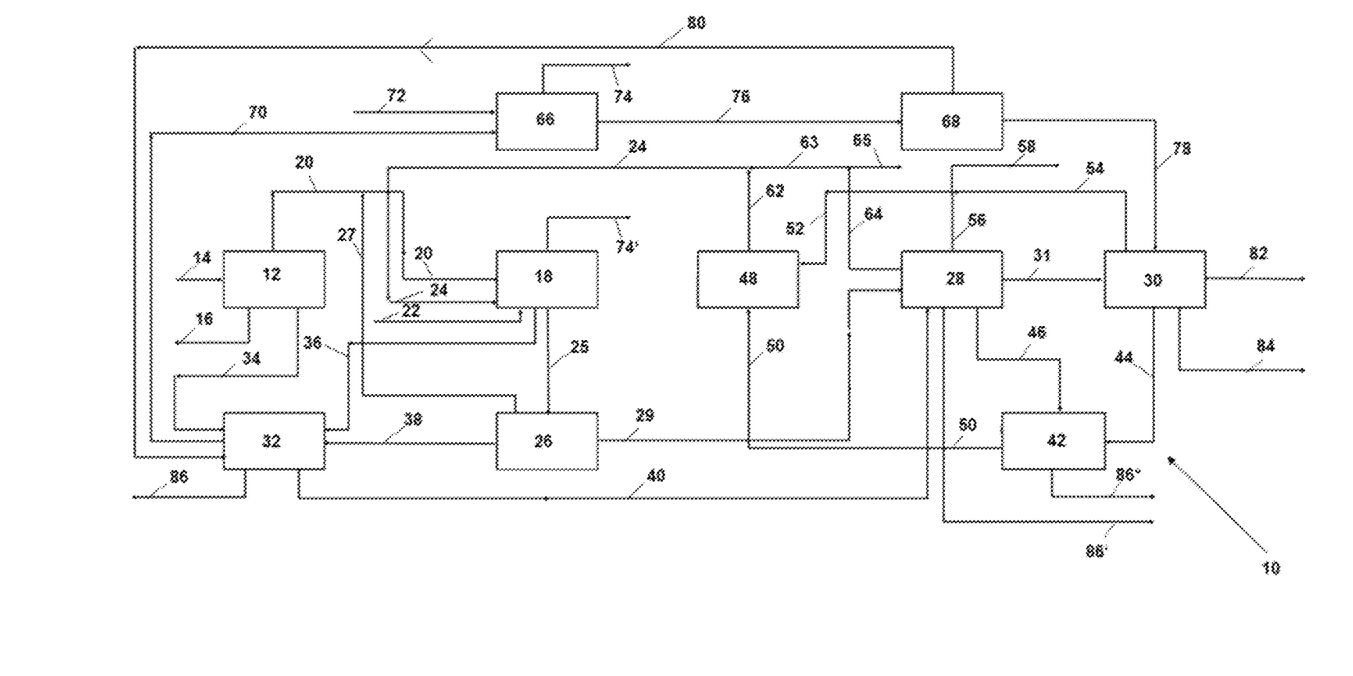
FIG. 1 is a schematic view of a system for producing synthetic fuels.

The system 10 shown in FIG. 1 for producing synthetic fuels comprises:

a) an apparatus 12 for separately extracting carbon dioxide and water from ambient air having an air supply line 14 and an exhaust air line 16, b) a synthetic gas production apparatus 18 for producing a raw synthesis gas comprising carbon monoxide, hydrogen, carbon dioxide and water, the synthesis gas production apparatus 18 having supply line 20 for carbon dioxide leading from the apparatus 12 for separately extracting carbon dioxide and water from ambient air, a supply line 22 for air and a supply line 24 for water or water vapor and a raw synthesis gas discharge line 25, c) a separating apparatus 26 for separating carbon dioxide and water from the raw synthesis gas produced in the synthesis gas production apparatus 18 with a carbon dioxide return line 27 that opens from the separating apparatus 26 into the supply line 20 for carbon dioxide leading from the apparatus 16 for separately extracting carbon dioxide and water from ambient air to the synthesis gas production apparatus 18, d) a Fischer-Tropsch apparatus 28 for producing hydrocarbons by means of a Fischer-Tropsch process from the synthesis gas from which carbon dioxide and water were separated in the separating apparatus 26, the synthesis gas being supplied to the Fischer-Tropsch apparatus 28 via a synthesis gas supply line 29 leading from the separating apparatus 26 to the Fischer-Tropsch apparatus 28, e) a refining apparatus 30 for refining the hydrocarbons produced in the Fischer-Tropsch apparatus 28 to make the synthetic fuels, which refining apparatus is connected to the Fischer-Tropsch apparatus via a hydrocarbon supply line 31, f) a desalination apparatus 32 for desalinating water, the desalination apparatus 32 having a water supply line 34 from the apparatus 12 for separately extracting carbon dioxide and water from ambient air, a water supply line 36 from the synthesis gas production apparatus 18 and a water supply line 38 from the separating apparatus 26 as well as a water discharge line 40 to the Fischer-Tropsch apparatus 28, and g) a water purification apparatus 42 comprising a water supply line 44 leading from the refining apparatus 30 and a water supply line 46 leading from the Fischer-Tropsch apparatus 28 in each case for purifying water produced therein.

The system 10 further comprises a pre-reformer 48 for converting higher hydrocarbons to methane, carbon oxides, water and hydrogen. A water vapor supply line 50 leading from the water purification apparatus 42 to the pre-reformer 48 leads into the pre-reformer 48. In addition, a supply line 52 for process gas and return gas, which is fed from the process gas discharge line 54 leading out of the refining apparatus 30 and from the gas discharge line 56 leading out of the Fischer-Tropsch apparatus 28, leads into the pre-reformer 48. A part of the gas discharged from the Fischer-Tropsch apparatus 28 is directed into the supply line 52, while the remainder is discharged from the system 10 via the torch line 58. A circulation line 62 leads from the pre-reformer 48 to the supply line 24 for water or water vapor and from there to the synthesis gas production apparatus 18 for supplying the methane, carbon oxide, water and hydrogen compounds formed in the pre-reformer 48 to the synthesis gas production apparatus 18. A water vapor return line 63 also leads into the supply line 24 and is connected to a water vapor discharge line 64 leading from the Fischer-Tropsch apparatus 28. The water vapor discharge line 64 branches into a water vapor return line 63 and into an excess water vapor line 65 that leads away from the water vapor discharge line 64.

Finally, the system 10 also comprises a hydrogen production apparatus 66 as well as a hydrogen compression apparatus 68 for producing hydrogen required in the refining apparatus 30. A water supply line 70 and an air supply line 72 coming from the desalination apparatus 32 lead into the hydrogen production apparatus 66. In addition, the hydrogen production apparatus 66 has an exhaust air line 74 and a hydrogen line 76 leading to the hydrogen compression apparatus 68. From the hydrogen compression apparatus 68, a hydrogen line 78 leads into the refining apparatus 30 and a water line 80 leads into the desalination apparatus 32.

The refining apparatus 30 comprises one or more isocracker reactors (not shown), a hydrogen stripper (not shown) and one or more distillation columns (not shown). Furthermore, the refining apparatus 30 comprises a kerosene line 82 and a gasoline line 84.

In addition, waste water lines 86, 86', 86" lead from the desalination apparatus 32, from the Fischer-Tropsch apparatus 28 and from the water purification apparatus 42. Finally, the synthesis gas production apparatus 18 also has an exhaust air line 74'.

During the operation of the system 10, the apparatus 12 for separately extracting carbon dioxide and water from ambient air is supplied with air via the air supply line 16, from which air carbon dioxide and water are separated in the apparatus 12. Remaining exhaust air is discharged from the apparatus 12 via the exhaust air line 16, whereas in the apparatus 12 the water is separated from the carbon dioxide by condensation. The carbon dioxide separated off is fed via the supply line 20 into the synthesis gas production apparatus 18, to which water vapor containing methane, carbon oxides and hydrogen and air is also supplied via the supply lines 24, 22. In the synthesis gas production apparatus 18, a raw synthesis gas comprising carbon monoxide, hydrogen, water vapor and carbon dioxide is produced, from which a large part of the water is separated off by condensation. The water separated off is fed into the desalination apparatus 32 via the water supply line 38, whereas the raw synthesis gas is fed into the separating apparatus 26 via the line 25. There, carbon dioxide is separated from the raw synthesis gas by absorption, which carbon dioxide is fed via line 27 into line 20 and via the latter into the synthesis gas production apparatus 18. In addition, water is separated in the separating apparatus 26 by condensation from the raw synthesis gas, which water is conducted via the line 38 into the desalination apparatus 32. The water separated off in the apparatus 12 is also supplied to the desalination apparatus 32 via the water supply line 34. Finally, the purified synthesis gas is fed via line 29 into the Fischer-Tropsch apparatus 28, in which the synthesis gas is converted to predominantly normal paraffin hydrocarbons. These hydrocarbons are fed via line 31 into the refining apparatus 30, in which they are converted to synthetic raw fuels by means of hydro-isomerization and cracking (isocracking), which synthetic raw fuels are then separated in the hydrogen stripper and separated into the kerosene and gasoline fractions in the one or more distillation columns of the refining apparatus 30, which fractions are discharged from the system 10 via lines 82, 84. Water produced in the Fischer-Tropsch apparatus 28 and in the refining apparatus 30 is fed via the lines 46, 44 into the water purification apparatus 42, in which the waste water is purified by means of partial evaporation. The reaction carried out in the Fischer-Tropsch apparatus 28 is a very highly exothermic reaction that requires cooling. For this purpose, fully desalinated water from the desalination apparatus 32 is supplied to the Fischer-Tropsch apparatus 28 via the water discharge line 40, the reaction heat of the Fischer-Tropsch synthesis being discharged via the water vapor discharge line 64 by means of the generation of water vapor. Most of the water vapor is supplied to the synthesis gas production apparatus 18 via the water vapor return line 63 and the supply line 24, whereas the excess water vapor is discharged from the Fischer-Tropsch apparatus 28 via the excess water vapor line 65 and is used, for example, to evaporate the waste water that runs from the Fischer-Tropsch apparatus 28 to the water purification apparatus 42 via the water supply line 46. The flow of water vapor discharged via the water vapor supply line 50 leading to the pre-reformer 48 contains approx. 2% hydrocarbons, which are converted in the pre-reformer 48 to methane, carbon oxides, water and hydrogen. The remaining purified waste water is fed to the municipal waste water treatment facility via line 86". In addition, return gas produced in the Fischer-Tropsch apparatus 28 and process gas produced in the refining apparatus are fed via the lines 54, 56, 52 into the pre-reformer 48, in which higher hydrocarbons are converted into methane, carbon oxides, water and hydrogen. The flow produced in the pre-reformer 48, which comprises methane, carbon oxides, water and hydrogen, is fed to the supply line 24 via the circulation line 62 together with the water vapor flow coming from the water vapor return line 63 and from said supply line to the synthesis gas production apparatus 18.

In the hydrogen production apparatus 66, hydrogen is produced from the air supplied via line 72 and the water supplied via line 70, which hydrogen is supplied as a mixture with water vapor via line 76 to the hydrogen compression apparatus 68, in which the hydrogen is compressed to the required pressure and at the same time the water contained is separated by means of condensation. While the compressed hydrogen is supplied to the refining apparatus 30 via line 78, the separated water is fed via line 80 to the desalination apparatus 32.

The present invention will be described below using an example that is illustrative but does not restrict the invention.

EXAMPLE

The method according to the invention was simulated in a system shown in FIG. 1 and described above using the PRO/II (AVEVA) process simulation software for the production of 15,000 liters of kerosene per day. The following product streams were obtained for the individual lines:

| No. | Designation | kg/h | Nm³/h |
|---|---|---|---|
| 14 | Air supply line | | 9576623 |
| 20 | Supply line for carbon dioxide to the synthesis gas production apparatus | 3941 | |
| 22 | Supply line for air to the synthesis gas production apparatus | 7093 | |
| 24 | Supply line for water or water vapor to the synthesis gas production apparatus | 4137 | |
| 25 | Raw synthesis gas discharge line to the separating apparatus | 4407 | |
| 27 | Carbon dioxide return line from separating apparatus | 1216 | |
| 29 | Synthesis gas supply line from the separating apparatus to the Fischer-Tropsch apparatus | 2794 | |
| 31 | Hydrocarbon supply line | 834 | |
| 34 | Water supply line from the apparatus for separately extracting carbon dioxide and water from ambient air to the desalination apparatus | 4501 | |
| 36 | Water supply line from the synthesis gas production apparatus to the desalination apparatus | 552 | |
| 38 | Water supply line from the separating apparatus to the desalination apparatus | 397 | |
| 40 | Water discharge line from the desalination apparatus to the Fischer-Tropsch apparatus | 4415 | |
| 44 | Water supply line from the refining apparatus to the water purification apparatus | 3.2 | |
| 46 | Water supply line from the Fischer-Tropsch apparatus to the water purification apparatus | 1413 | |
| 50 | Water vapor supply line to the pre-reformer | 999 | |
| 52 | Supply line for fuel gas and return gas to the pre-reformer | 576 | |
| 54 | Fuel gas discharge line | 65 | |
| 56 | Gas discharge line | 547 | |
| 58 | Torch gas discharge line | 37 | |
| 62 | Circulation line from the pre-reformer | 1575 | |
| 63 | Water vapor return line from the Fischer-Tropsch apparatus | 2562 | |
| 64 | Water vapor discharge line from the Fischer-Tropsch apparatus | 4349 | |
| 65 | Excess water vapor line from the Fischer-Tropsch apparatus | 1786 | |
| 70 | Water supply line to the hydrogen production apparatus | 172 | |
| 72 | Air supply line | | 21130 |
| 76 | Hydrogen line to the hydrogen compression apparatus | 20.7 | |
| 78 | Hydrogen line to the refining apparatus | 18.9 | |
| 80 | Water discharge line to the desalination apparatus | 1.8 | |
| 82 | Kerosene line | 484 | |
| 84 | Gasoline line | 300 | |
| 86 | Waste water line | 865 | |
| 86' | Waste water line | 66 | |
| 86" | Waste water line | 418 | |

LIST OF REFERENCE SIGNS 10 system for producing synthetic fuels
12 apparatus for separately extracting carbon dioxide and water from ambient air
14 air supply line
16 exhaust air line
18 synthesis gas production apparatus
20 supply line for carbon dioxide to the synthesis gas production apparatus
22 supply line for air to the synthesis gas production apparatus
24 supply line for water or water vapor to the synthesis gas production apparatus
25 raw synthesis gas discharge line to the separating apparatus
26 separating apparatus for separating carbon dioxide and water from raw synthesis gas
27 carbon dioxide return line from separating apparatus
28 Fischer-Tropsch apparatus
29 synthesis gas supply line from the separating apparatus to the Fischer-Tropsch apparatus
30 refining apparatus
31 hydrocarbon supply line
32 desalination apparatus
34 water supply line from the apparatus for separately extracting carbon dioxide and water from ambient air to the desalination apparatus
36 water supply line from the synthesis gas production apparatus to the desalination apparatus
38 water supply line from the separating apparatus to the desalination apparatus
40 water discharge line from the desalination apparatus to the Fischer-Tropsch apparatus
42 water purification apparatus
44 water supply line from the refining apparatus to the water purification apparatus
46 water supply line from the Fischer-Tropsch apparatus to the water purification apparatus
48 pre-reformer
50 water vapor supply line to the pre-reformer
52 supply line for process gas and return gas to the pre-reformer
54 process gas discharge line
56 gas discharge line
58 torch gas discharge line
62 circulation line from the pre-reformer
63 water vapor return line from the Fischer-Tropsch apparatus
64 water vapor discharge line from the Fischer-Tropsch apparatus 65 excess water vapor line from the Fischer-Tropsch apparatus
66 hydrogen production apparatus
68 hydrogen compression apparatus
70 water supply line to the hydrogen production apparatus
72 air supply line
74, 74' exhaust air line
76 hydrogen line to the hydrogen compression apparatus
78 hydrogen line to the refining apparatus
80 water discharge line to the desalination apparatus
82 kerosene line
84 gasoline line
86, 86', 86" waste water line

The invention claimed is:

1. A system (10) for producing synthetic fuels, comprising:
   a) an apparatus (12) for separately extracting carbon dioxide and water from ambient air,
   b) a synthesis gas production apparatus (18) for producing a raw synthesis gas comprising carbon monoxide, hydrogen, carbon dioxide and water, the synthesis gas production apparatus (18) having a supply line (20) for carbon dioxide leading from the apparatus (12) for separately extracting carbon dioxide and water from ambient air, a supply line (22) for air and a supply line (24) for water,
   c) a separating apparatus (26) for separating carbon dioxide and water from the raw synthesis gas produced in the synthesis gas production apparatus (18),
   d) a Fischer-Tropsch apparatus (28) for producing hydrocarbons by means of a Fischer-Tropsch process from the synthesis gas from which carbon dioxide and water were separated in the separating apparatus (26),
   e) a refining apparatus (30) for refining the hydrocarbons produced in the Fischer-Tropsch apparatus (28) into synthetic fuels,
   f) a desalination apparatus (32) for desalinating water, the desalination apparatus (32) having a water supply line (34) from the apparatus (12) for separately extracting carbon dioxide and water from ambient air and a water discharge line (40) to the Fischer-Tropsch apparatus (28), and
   g) a water purification apparatus (42) comprising a water supply line (46) leading from the Fischer-Tropsch apparatus (28) for purifying water produced therein,
   the system further comprising a pre-reformer (48) for converting hydrocarbons other than methane into methane, carbon oxides, water and hydrogen and i) a water vapor supply line (50) leading from the water purification apparatus (42) to the pre-reformer (48), ii) a process gas supply line (54, 52) leading from the refining apparatus (30) to the pre-reformer (48) and/or a return gas line (56, 52) leading from the Fischer-Tropsch apparatus (28) to the pre-reformer (48) and iii) a circulation line (62) leading from the pre-reformer (48) to the supply line (24) for water connected to the synthesis gas production apparatus (18).

2. The system (10) according to claim 1, characterized in that said system has no fresh water supply line.

3. The system (10) according to claim 1, characterized in that the water purification apparatus (42) is designed as a partial evaporator in which not only water but also hydrocarbons contained therein are partly evaporated.

4. The system (10) according to claim 1, characterized in that the refining apparatus (30) comprises at least one isocracker reactor, the at least one isocracker reactor having a catalyst that does not require sulfidation.

5. The system (10) according to claim 1, characterized in that the desalination apparatus (32) for desalinating water also has a water supply line (36) from the synthesis gas production apparatus (18) and a water supply line (38) from the separating apparatus (26).

6. The system (10) according to claim 1, characterized in that the water purification apparatus (42) also comprises a water supply line (44) leading from the refining apparatus (30) for purifying water produced therein.

7. The system (10) according to claim 1, characterized in that the synthesis gas production apparatus (18) comprises one or more co-solid oxide electrolytic cells.

8. The system (10) according to claim 1, characterized in that the separating apparatus (26) comprises an amine scrubber for separating carbon dioxide by absorption from the synthesis gas, a compressor for condensing water and for compressing the gas to the pressure required in the Fischer-Tropsch synthesis, a carbon dioxide return line (27) leading to the synthesis gas production apparatus (18) or to the line (20) for carbon dioxide leading from the apparatus (12) for separately extracting carbon dioxide and water to the synthesis gas production apparatus (18) and a synthesis gas supply line (29) leading to the Fischer-Tropsch apparatus (28).

9. The system (10) according to claim 1, characterized in that the desalination apparatus (32) comprises one or more anion and cation exchangers and a membrane apparatus for degassing, which are designed in such a way that water can be desalinated and degassed to such an extent that the conductivity thereof is less than 20 µS/cm.

10. The system (10) according to claim 1, characterized in that the refining apparatus (30) comprises a hydrogen stripper and one or more distillation columns.

11. The system (10) according to claim 1, characterized in that said system further has a hydrogen production apparatus (66) and a hydrogen compression apparatus (68), the system (10) further having a water line (70) leading from the apparatus (12) for desalinating water to the hydrogen production apparatus (66), a water line (80) leading from the hydrogen compression apparatus (68) to the desalination apparatus (32), a hydrogen line (76) leading from the hydrogen production apparatus (66) to the hydrogen compression apparatus (68), and a hydrogen line (78) leading from the hydrogen compression apparatus (68) to the refining apparatus (30).

12. A method for producing synthetic fuels, which is carried out in a system (10) according to claim 1.

13. The method according to claim 12, characterized in that in the method less than 20% fresh water at all is supplied, fresh water supply meaning the supply of any water from the outside into the system that has not been obtained in the apparatus for separately extracting carbon dioxide and water from ambient air.

14. The method according to claim 12, characterized in that in the desalination apparatus (32) the water is purified to water having a conductivity of less than 20 µS/cm.

15. The method according to claim 12, characterized in that torch gas is derived from the Fischer-Tropsch apparatus (28), the flow of torch gas being greater than the quotient of the amount of nitrogen and argon contained in the flow discharged from the apparatus (12) for separately extracting carbon dioxide and water from ambient air and the total concentration of nitrogen and argon set in the return gas flow from the Fischer-Tropsch apparatus (28) to the pre-reformer (48), the total concentration of nitrogen and argon in the return gas flow from the Fischer-Tropsch apparatus (28) to the pre-reformer (48).

16. The method according to claim 12, characterized in that the system (10) has a hydrogen production apparatus (66) and a hydrogen compression apparatus (68) and the refining apparatus (30) comprises one or more isocracker reactors, a hydrogen stripper and one or more distillation columns, the hydrogen produced in the hydrogen production apparatus (66) being supplied to the hydrogen compression apparatus (68) and being compressed therein and the compressed hydrogen being supplied to the hydrogen stripper of the refining apparatus (30).

17. The method according to claim 12, characterized in that the refining apparatus (30) comprises one or more isocracker reactors in which a catalyst is used that does not require sulfidation, and a noble metal catalyst is used, and the water purification apparatus (42) is supplied with water from the Fischer-Tropsch apparatus (28) and water from the refining apparatus (30), the water being purified in the water purification apparatus (42) by means of partial evaporation, at least 70% of the partly evaporated water vapor containing hydrocarbons being supplied to the pre-reformer (48) via the water vapor supply line (50) and less than 30% of the purified water having a COD of less than 2,000 mg/l and being supplied to a municipal waste water plant.

18. The method according to claim 12, characterized in that at least 80% of the water that accumulates in the apparatus (12) for separately extracting carbon dioxide and water from ambient air, in the synthesis gas production apparatus (18), in the separating apparatus (26) and in the optional hydrogen compression apparatus (68) is supplied to the desalination apparatus (32).

* * * * *